F. S. KOCHENDORFER AND H. BLOUNT.
MACHINE FOR COATING WIRE.
APPLICATION FILED JULY 9, 1917.
1,303,070.
Patented May 6, 1919.
8 SHEETS—SHEET 4.
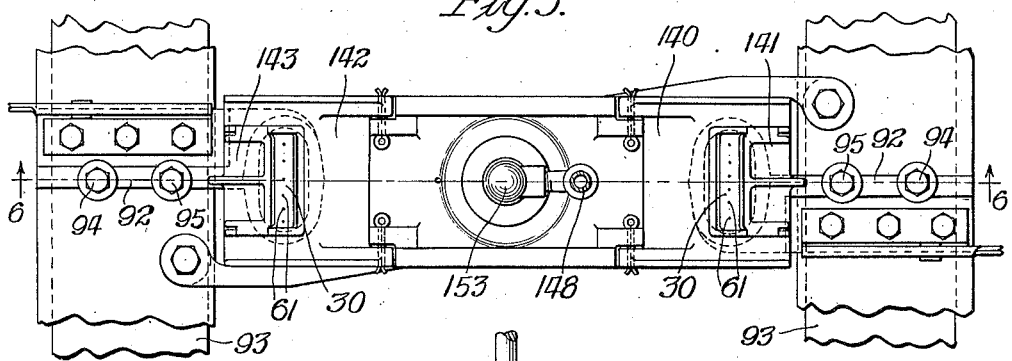
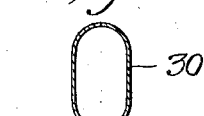
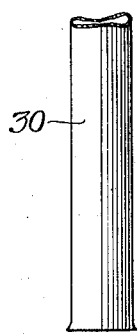
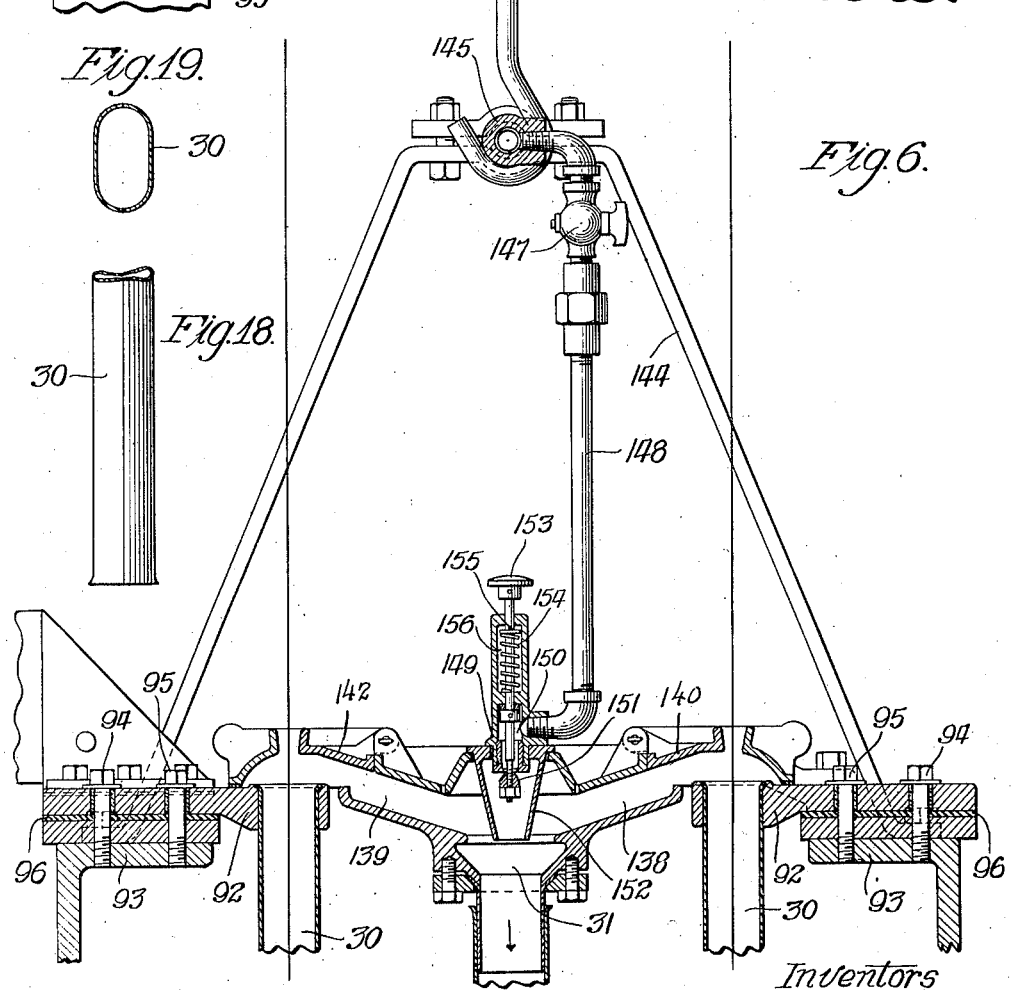
Inventors
Frederic S. Kochendorfer
Harry Blount
by J. G. Roberts Atty.

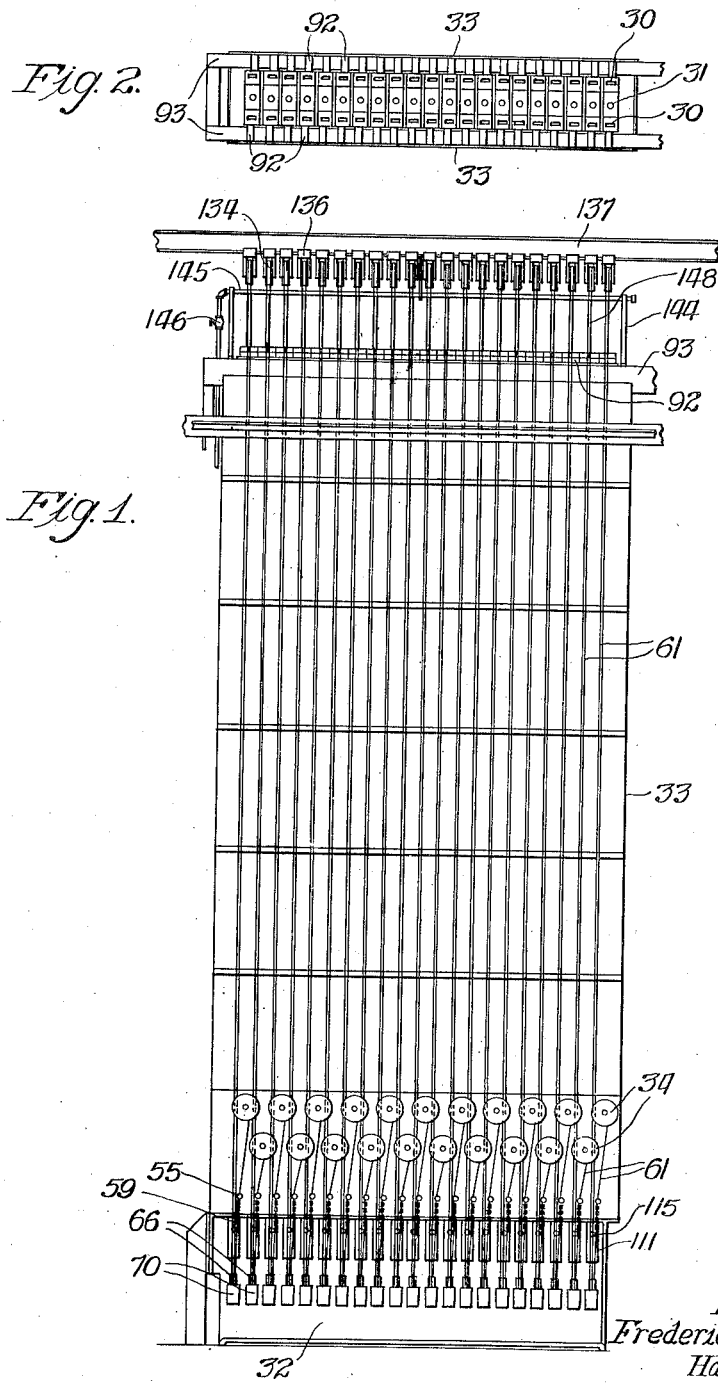

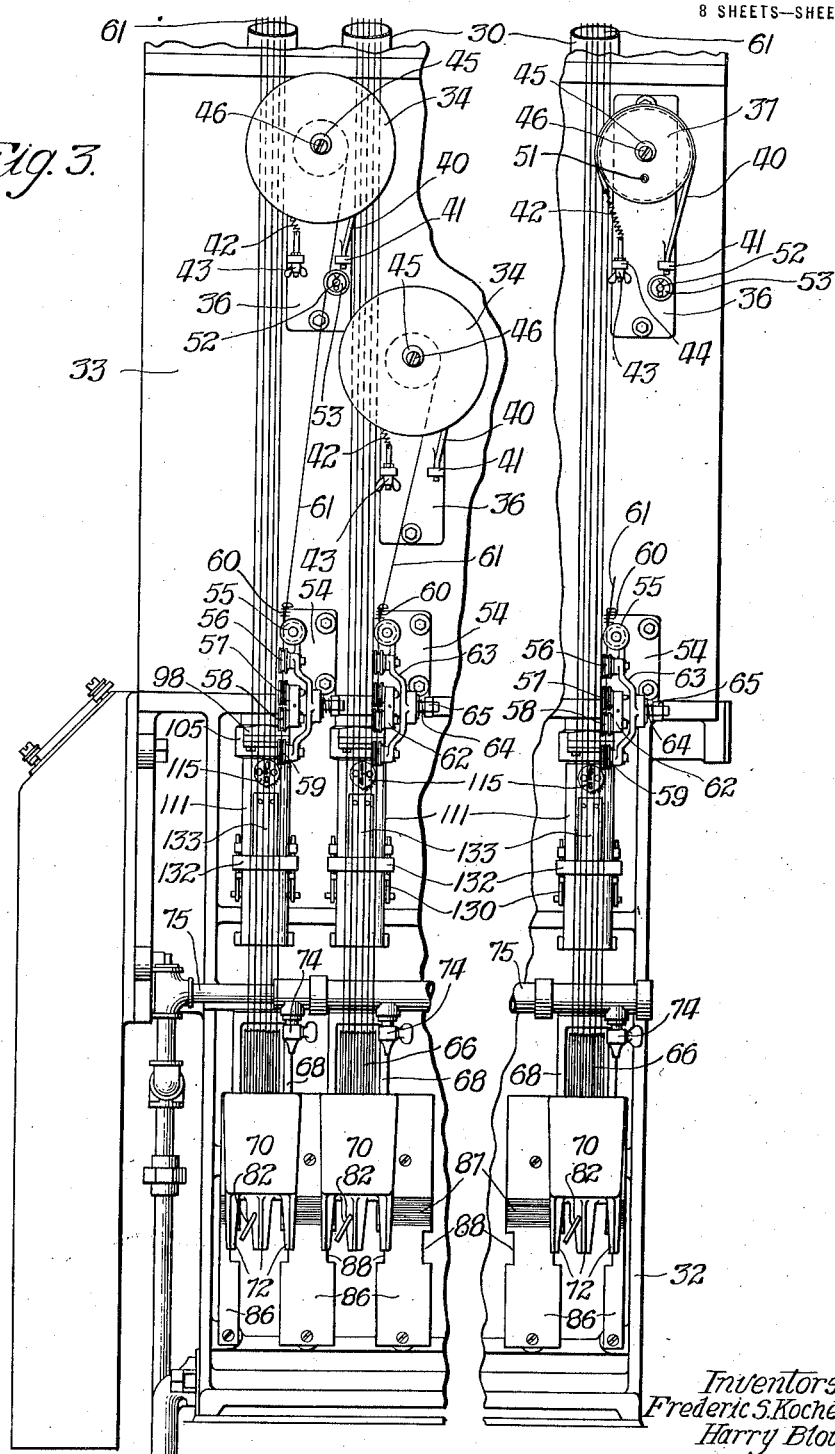

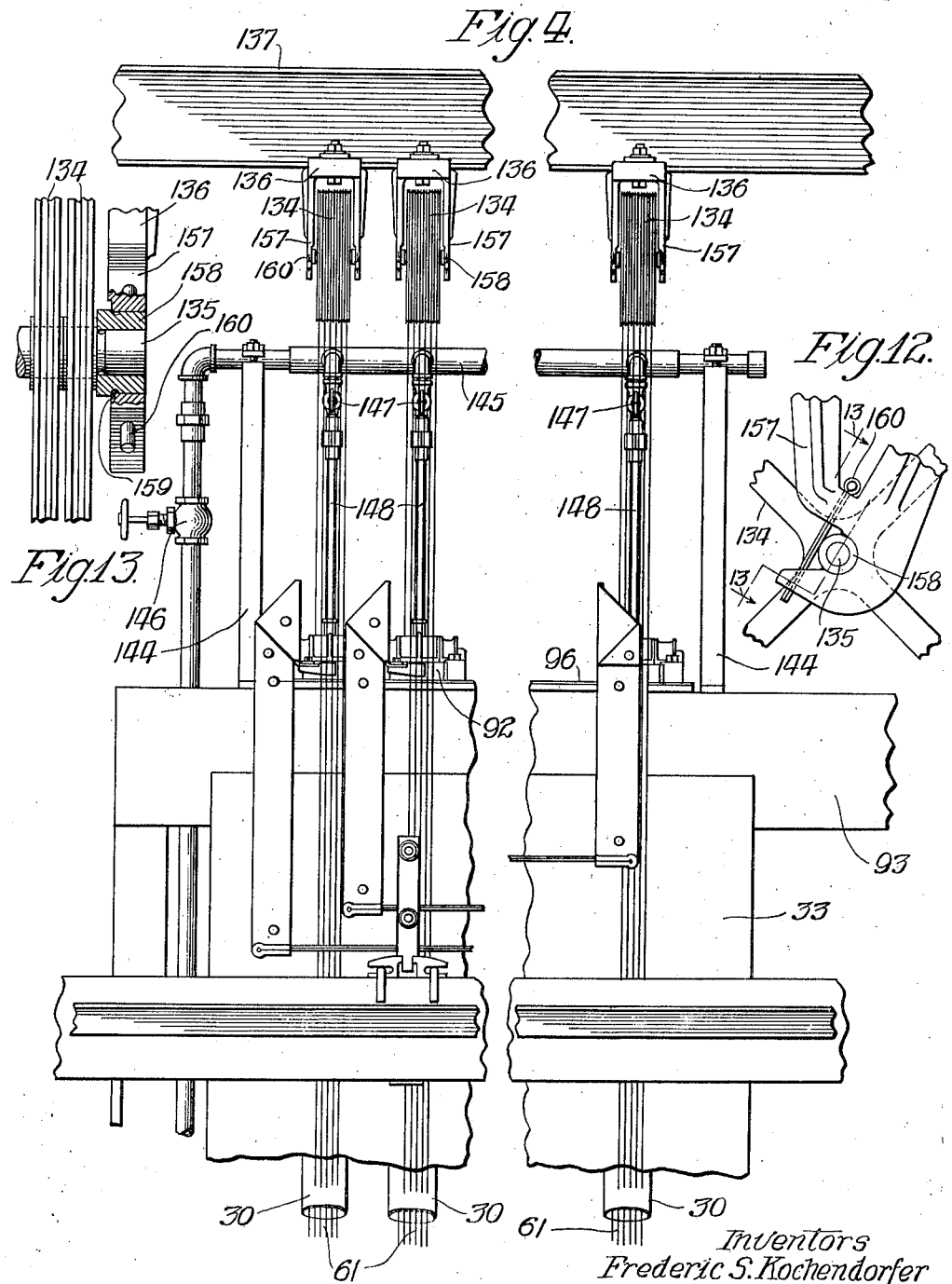

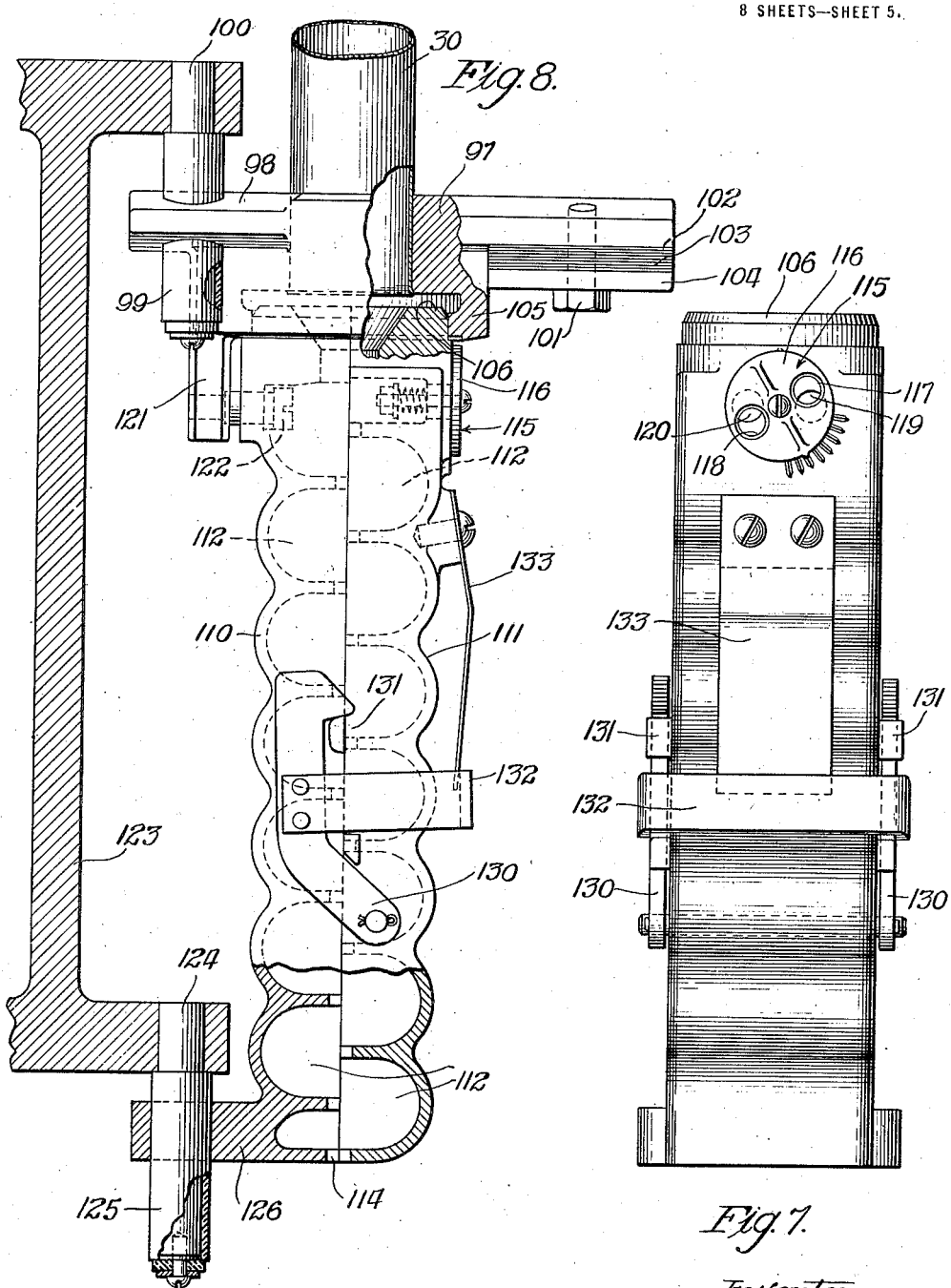

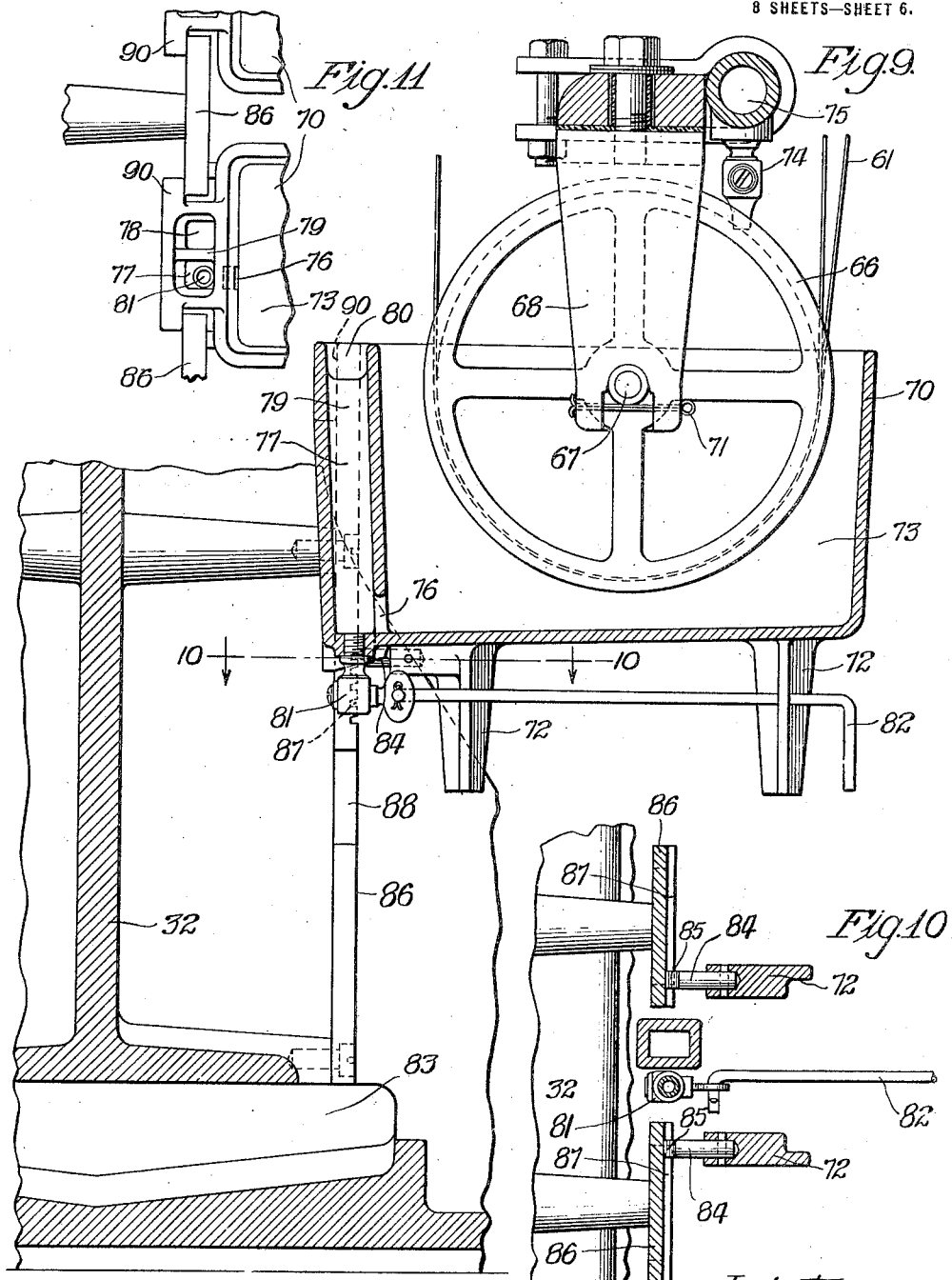

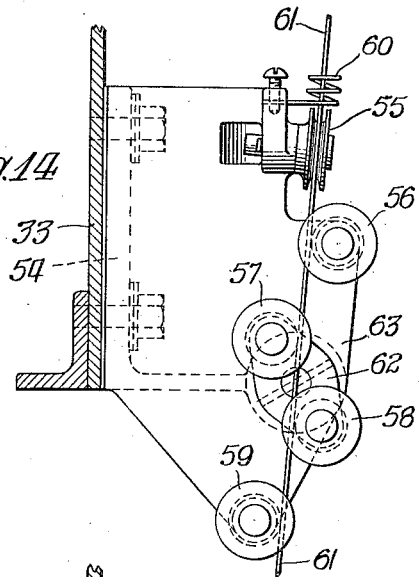
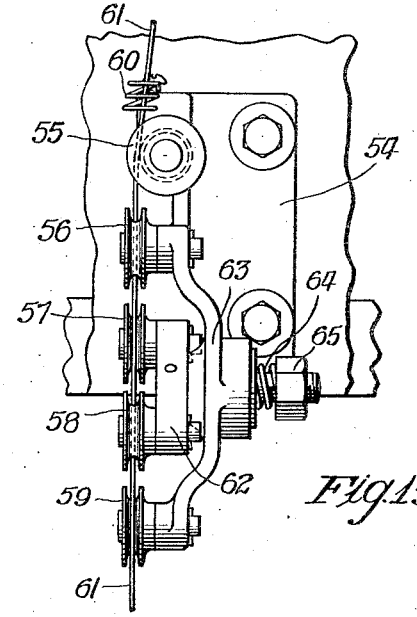
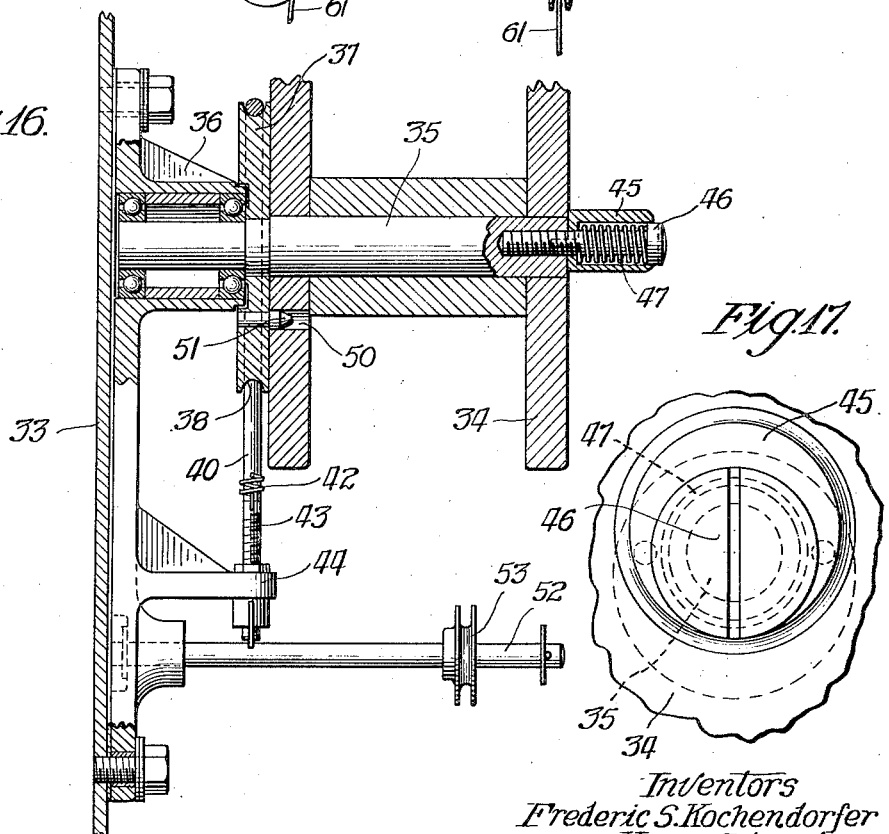
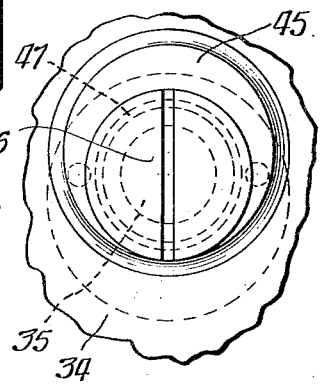

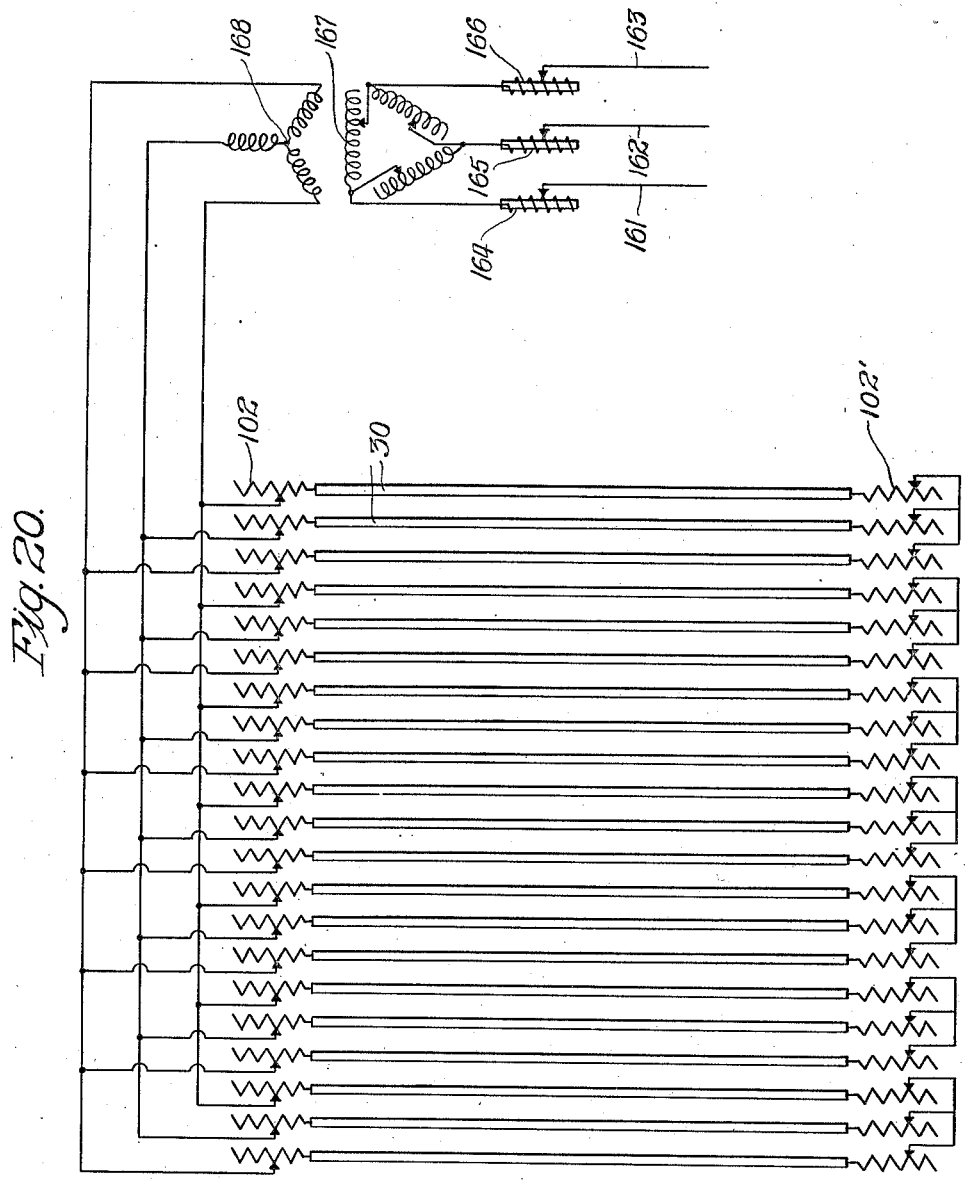

UNITED STATES PATENT OFFICE.

FREDERIC S. KOCHENDORFER, OF CHICAGO, AND HARRY BLOUNT, OF OAK PARK, ILLINOIS, ASSIGNORS TO WESTERN ELECTRIC COMPANY, INCORPORATED, OF NEW YORK, N. Y., A CORPORATION OF NEW YORK.

MACHINE FOR COATING WIRE.

1,303,070.   Specification of Letters Patent.   Patented May 6, 1919.

Application filed July 9, 1917. Serial No. 179,479.

*To all whom it may concern:*

Be it known that we, FREDERIC S. KOCHENDORFER and HARRY BLOUNT, citizens of the United States, residing at Chicago, in the county of Cook and State of Illinois, and Oak Park, in the county of Cook and State of Illinois, respectively, have invented certain new and useful Improvements in Machines for Coating Wire, of which the following is a full, clear, concise, and exact description.

This invention relates to an improved machine for coating wire, and more particularly to a machine for applying and baking an insulating enamel coating upon wire.

Machines for coating wire with insulating enamel are well known in the art. However, the machines which have been devised and used for this purpose heretofore are exceedingly slow in their operation, wire ranging between the sizes 13 to 24 B. & S. gage traveling through the baking chamber at a rate of approximately 3½ to 5 feet per minute, depending upon the size of the wire. The machines contain many other inherent disadvantages, such as lack of temperature control for each baking unit, inaccessibility of the baking units and a corresponding high cost of maintenance and poor heat insulation resulting in a low operating efficiency.

One of the objects of this invention consists, therefore, in providing an improved machine for coating wire with insulating enamel in which the speed at which the wire is drawn through the oven is greatly increased and consequently the efficiency and rate of production is correspondingly increased.

Another object consists in providing an improved machine comprising a plurality of baking units which are grouped together for the purpose of obtaining a high heat insulating efficiency, each one of said units being adapted for individual operation independent of all the rest as to the kind of enamel used and the baking temperature employed.

A further object comprises an improved electrical system for heating the baking units.

Other features consist in improved means for controlling the air currents in the baking units; in providing an improved and more efficient means for suspending the heating units and air current controlling means; in providing a simplified and more efficient compound container together with an improved compound distributing system; in producing an efficient and simplified smoke or vapor regulating system together with a water spraying means, said means being equipped with an improved cleaning device whereby clogging and choking of the water supply, due to vapor condensation, is prevented; and in providing an improved form of oven construction whereby the working parts are readily accessible and whereby the operation of baking insulating enamel on wire is much more efficiently and rapidly performed.

With these and other objects in view, which will become apparent from the following description and the appended claims, the invention consists in the improved machine illustrated in the accompanying drawings, in which:

Figure 1 is a conventional front elevation of the machine and illustrates the proportions thereof;

Fig. 2 is a conventional plan view likewise showing the proportions of the machine;

Fig. 3 is a fragmentary elevation of the lower part of the machine showing in detail the mechanism associated with three of the heating units;

Fig. 4 is a fragmentary front elevation of the upper part of the same portion of the machine illustrated in Fig. 3;

Fig. 5 is a plan elevation of one unit of the machine;

Fig. 6 is a section on the plane 6—6 of Fig. 5 looking in the direction of the arrows;

Fig. 7 is a front elevation of the air current controlling means or muffle.

Fig. 8 is an end elevation partly in section of Fig. 7 showing lower heating tube terminal and method of guiding heating tube and muffle;

Fig. 9 is a partial end elevation of the lower part of the machine illustrating the insulating compound controlling mechanism, container and method of supporting same;

Fig. 10 is a section on the line 10—10 of Fig. 9 looking in the direction of the arrows;

Fig. 11 is a plan view of the rear end of two compound containers and illustrates the means for guiding the upper end of the containers;

Fig. 12 is an end elevation of the lower end of the upper sheave supporting bracket;

Fig. 13 shows a section through the upper sheave bracket support on the plane 13—13 of Fig. 12 looking in the direction of the arrows and illustrates the method of supporting the sheave spindle;

Fig. 14 is an end elevation of the wire tensioning device;

Fig. 15 is a front elevation thereof;

Fig. 16 is an end elevation partly in section showing the method of supporting the wire supply spindle on the front part of the machine;

Fig. 17 is an enlarged view illustrating the means for holding the supply spool on the spindle;

Fig. 18 is a front elevation of the lower end of a heating tube or oven;

Fig. 19 is a transverse section thereof; and

Fig. 20 is a wiring diagram illustrating the circuit used for heating the baking elements of the machine.

In the preferred form of the invention as herein illustrated and described the machine is constructed in rectangular shape and is equipped with 21 heating units such as 30 on each of the long sides of the rectangle. These heating units mounted on the opposite sides of the rectangle, as illustrated in Fig. 2, are mounted in pairs and are each served by a common smoke or vapor exhaust system such as 31 which is located on the center line of the rectangle between the pairs of heating units. Obviously the machine can readily be constructed with a greater or less number of said units. The machine is mounted on a base 32, to which is secured a sheet iron covering 33 supported by a structural steel framework. The heating tubes or ovens are rigidly held and suspended from a heavy angle iron framework at the top of the machine and packed in about the heating tubes is a suitable thickness of heat insulating material which is retained in position by the sheet iron covering 33. The apparatus associated with each unit is identical and consequently the following description of one such unit and its *modus operandi* will be sufficient to indicate the operation of the complete machine.

The operating mechanism of the machine which is mounted outside of the sheet metal covering 33 is illustrated in detail in Figs. 3 and 4, in which the first two and the last heating units of the machine are shown. Thus by placing Fig. 4 above Fig. 3 a front elevation of the machine will be obtained with the operating mechanisms greatly enlarged as compared to Fig. 1, due to the breaking away of the middle portion of both the length and the breadth of the machine. As illustrated in these figures, a supply spool reel such as 34 is provided for each heating unit of the machine, these reels carrying the bare wire prior to the enameling operation. The spools or reels 34 are mounted on spindles such as 35 attached to a cast iron bracket 36 which is secured to the sheet iron covering 33 of the machine, as clearly illustrated in Fig. 16. Mounted on the spindle 35 is a brake disk 37, in the groove 38 of which a flexible cord 40 is laid, one end of which is securely attached to the lug 41 attached to the frame 33, and the other end of which is connected to a spiral spring 42. The other end of said spring is fastened to an adjustable thumb nut 43 which is held in the supporting arm 44 of the bracket 36. It will be evident that when the spring 42 is put under tension, due to the tightening up of the thumb nut 43, the flexible cord 40 will be tightened in the groove 38 of the brake disk 37. This mechanism consequently serves as a means for retarding the rotation of the spindle 35.

The spool or reel 34 is held on the spindle 35 by means of the eccentric spring pressed sleeve 45, which is held in position on the spindle 35 by means of the screw 46 under the compression of the spiral spring 47. Since the sleeve 45 is eccentrically mounted with respect to the axis of the spindle 35, it can be rotated so that its outer periphery will be in alinement with the outer periphery of the spindle 35, at which time a supply spool 34 may readily be placed in position or taken off the spindle 35. When the supply spool has been placed in position on the spindle a turning of the eccentric sleeve 45 will throw its axis out of alinement with the axis of the spindle 35 and consequently the inner end surface of said sleeve will move up against the outer face of the supply spool and prevent its sliding off of the spindle 35. Each supply spool 34 is fitted with one or more driving holes 50 in one or both of its faces, one of which holes is brought into alinement with a taper pointed pin 51 secured to the brake disk 37, which prevents slipping of the supply spool on the spindle 35. Secured to the front face of the machine and directly beneath each supply spool 34 of the upper row is a rod 52, on which is rotatably mounted a grooved guiding disk 53, to the groove of which the wire is fed from the supply spool.

Attached to the lower end of the inclosing sheeting below and slightly to the left of each supply spool 34 is a casting 54 on which is mounted a tensioning device. This tensioning device functions only to place tension on the wire after the free ends of it leave the supply spools and before the end from a new supply spool has been attached thereto, so that the wire in the heating tubes will be held reasonably taut, which will tend to reduce the vibration of said wire and prevent contact between the wire and the sides of the heating tube. This device serves to maintain on said wire a substantially uniform tension, which tension is not changed by any possible slackening of the wire between the supply spool and tension device. It therefore sustains a contact tension on the wire during the period of the splicing operation when the end of the wire from an empty supply spool is connected to the end of the wire on a full spool. The combined action of the brake and tension mechanisms prevents a jerking action of the wire as it is fed through the machine. This tensioning device is illustrated in detail in Figs. 14 and 15 and consists of a plurality of arms secured to the plate 54, on which are mounted the grooved pulleys 55, 56, 57, 58, and 59. The plane of the pulley 55 is substantially parallel to the plane of the front face of the oven; whereas the planes of the pulleys 56 to 59 inclusive are at right angles thereto. Mounted directly above the grooved pulley 55 is a steel spiral spring or pig tail 60 which guides the wire from the supply reel 34 to the upper pulley 55. The pulleys 55 to 59 are all rotatably mounted on suitable spindles, and the wire to be enameled 61 is threaded from the supply reel 34 through the grooves of the pulleys 55 and 56, between and in the grooves of the pulleys 57 and 58, and then through the groove of the pulley 59.

The spindles carrying the pulleys 57 and 58 are secured to a block 62 which is pivotally mounted on the bracket 63. By turning the block 62 the pulleys 57 and 58 are moved so as to throw the wire which is threaded through the pulleys 55 to 59 inclusive out of a straight line. The amount of curvature which is placed in this wire by the movement of the pulleys 57 and 58 will determine the tension which is put onto the wire. The block 62 is yieldingly held in position by the spring 64, the compression of which is regulated by the nut 65.

The wire 61, after passing through the tensioning device just described, is threaded over a grooved pulley or sheave 66 which is rotatably mounted on a spindle 67 held in a bracket 68 which is secured to the base of the machine, as illustrated in Fig. 9. The spindle 67 for each unit carries a plurality of the sheaves 66, the number depending upon the number of times it is desired to pass the wire through the insulating compound and bake it, in the preferred embodiment of the invention six of these sheaves being provided. The sheaves, as illustrated in Figs. 3 and 9, are so suspended that a little more than the lower half surface of each one thereof is contained in an insulating compound container 70. The spindle 67 with its bushing on which the sheaves 66 are rotatably mounted is held in the bracket 68 by means of the cotter pin 71. This method of holding the spindle in the bracket, together with the method used of journaling the spindle in said bracket, which will hereinafter be described in connection with the description of the mounting of the sheaves at the top part of the machine, makes the removal of the spindle and the sheaves a very simple operation which may be rapidly performed. This is very essential since the sheaves and the spindle are continually immersed in insulating compound which would interfere with the removal thereof if any complicated mounting mechanism were utilized. When the machine is not in operation and no wire has been strung on the sheaves, the weight of the spindle and the sheaves is supported by the cotter pin 71; but when the machine has been strung up for operation, this weight is taken off the pin, and the force of this weight together with the force exerted, due to the tension of the wire, is carried by the upper half of the mounting sleeve journal.

The compound containers 70 are preferably made of cast iron and are fitted with the supporting feet 72. They are equipped with a main compound chamber 73, to which the compound is supplied from a supply cock 74, one of which is mounted above each compound container 70. Said cocks are connected to a main compound supply line 75 which communicates with a main reservoir containing the compound, mounted in some convenient accessible place and at a sufficient height so that the compound will be supplied to the main 75 by the force of gravity.

In the operation of the machine a small stream of compound is continually flowing from the supply cock 74 into the chamber 73 of the container 70. It will be noted that the chamber 73 contains an opening 76 at the lower left hand corner thereof which communicates with a chamber 77, and consequently the level of the compound in the chambers 73 and 77 will always be the same. The chamber 77 is separated from a chamber 78 by a wall 79 and is in communication with said chamber due to the trough 80 interconnecting the upper portions of the chambers 77 and 78, wherefore when the compound in the container 70 rises to a level above the height of the wall 79 the compound will flow into the chamber 78. Connected to the lower portion of the chamber 77 is a drain cock 81 which is fitted with an extension handle 82, so that the operator can conveniently regulate the cock 81 from the front of the machine when the container 70 is in position on the machine without in any way molesting the position of the container. The drain cock 81 is used to drain the compound from the chamber 73. The compound in the chamber 77 which overflows into the chamber 78 falls into the draining chamber 83 of the main circulating system which is located at the bottom of the machine. The compound drained from all the containers 70 associated with the machine which is gathered in the draining chamber 83 is pumped from this chamber into a main reservoir and then recirculated. If desired or convenient, the compound which is pumped from the draining chamber 83 may be strained or filtered before returning it to the main reservoir.

Figs. 9, 10, and 11 illustrate the means utilized for holding the containers 70 in position. As shown in Fig. 10, the rear feet 72 of each container are equipped with pins 84 which are equipped with a chisel shaped projecting end 85. Mounted on the front of the machine, one for each container, are a series of plates such as 86 which are fitted with the corrugations or serrations 87 formed to fit and receive the chisel shaped end 85 of the pins 84. The plates 86 are mounted in pairs and are cut out or slotted as shown at 88. This cut out or slotted portion 88 of the plates is of such a size as to just conveniently pass a rectangular projection 90 attached to the upper rear end of each compound container 70. In placing these containers in position the rear rectangular projection 90 of the container is slipped through the opening formed by the rectangular slots 88 in the paired plates 86, and the container is then moved up with the extending ears of the projection 90 sliding up over the back faces of the plates 86. When the container has been raised to the desired position its front end is allowed to drop, whereby the ears on the projection 90 will bind against the rear faces of the plates 86 and at the same time the chisel shaped ends of the pins 84 will be inserted into one of the serrations or corrugations 87, thereby holding the container in place. When it is desired to remove the container it is simply necessary to raise the front end of the same to remove the ends 85 from the corrugations, allow the ears of the projection to slide down over the back faces of the plates 86 until said projection is in alinement with the rectangular slot formed by the cut-out portion 88, at which time the container may be moved forward and completely disconnected from the machine.

After the wire 61 has been threaded through one of the sheaves 66 in the container 70 it is then threaded through an air regulator or muffle, illustrated in detail in Figs. 7 and 8, after which it is fed into the heating element or tube 30. The heating tubes 30 are made of steel and are heated by the $I^2 R$ loss which is developed by a current flowing through the wall of the same. The tubes are oval in shape and are given a length which is determined by the size of wire which is to be coated and the speed at which the wire is to travel through the tubes. When a large number of different sizes of wire are to be insulated, the length of the tube must be determined by an approximation, which is calculated from the most efficient length for the smallest and largest sizes of wire with which the tube is to be used. For the preferred form of the invention herein shown a tube which is approximately 18 feet long is utilized, which gives very satisfactory results for wires ranging between the sizes of 13 to 24 B. & S. gage. With a tube of this length it is possible, depending upon the size of the wire, to insulate the same at a rate varying from $2\frac{1}{2}$ to 12 feet per minute. Obviously this rate increases very rapidly as the size of the wire is reduced below 24 B. & S. gage.

For the purpose of connecting the tubes to the external source of current supply a connector is secured to each end of each tube, a good connection being obtained between the tube and the connector by casting the connector directly onto the tube. A connector such as 92, which is secured to the extreme upper part of each tube, serves to suspend said tube in the machine, said connector being rigidly held and suspended from a heavy angle iron 93 mounted at the top of the machine by means of the bolts 94 and 95. The connector is insulated from the framework of the machine by means of the insulating strip 96 interposed between the connector and said framework. As the sole means of holding and suspending the tube 30 is the connector 92 at the top of the machine, the tube is free to move longitudinally, due to expansion and contraction as it is alternately heated and cooled.

For the purpose of steadying the tube and guiding it in this movment the brass terminal or connector 97 attached to the lower end of each tube has secured to it a lug 98 which is fitted with a pair of holes which snugly fit into a pair of insulating bushings such as 99 secured to pins such as 100 attached to the machine, as clearly illustrated in Fig. 8. The holes in the lug 98, the pins 100, and the associated bushings 99 serve to steady the heating tube 30 as it expands and contracts, due to heat variation, the lugs 98 sliding up and down on the bushings 99 with the tube 30 as it expands and contracts. The lower terminal or lug 97 is rigidly secured by means of a bolt 101 through a plurality of iron resistance regulating plates 102, depending upon the resistance desired, to a copper ribbon conductor 103, the bolt 101 being connected to the copper ribbon through the agency of a steel clamping plate 104.

The lower connector 97 is also fitted with a depending annular collar 105, the lower portion of which is cut out to receive the upper part 106 of the air regulator or muffle which is closely fitted to the lower end of the tube 30. By means of the muffle it is possible to control the flow of air through the heating tubes 30. If the bottom of the tubes 30 were left open, a strong current of air would be continually flowing through the tubes, under which circumstances it would be practically impossible to control the heat regulation of the tubes, and the tubes would also operate at a very inefficient rate, due to the great loss of heat. It is consequently necessary to connect to the lower end of the tube some means whereby the amount of air which is admitted into said tubes can be conveniently, efficiently, and accurately regulated. This purpose is fulfilled by the muffle, illustrated in Figs. 7 and 8.

The muffle is constructed in two parts 110 and 111, each of these parts being equipped with a plurality of laterally extending semicircular cavities 112, these cavities being so placed in the parts 110 and 111 that when they are properly alined in the machine the centers of all such cavities in one part lie substantially in the plane in which the uppermost point of the circumferential surface of the adjacent cavity in the other part is located. Consequently when these two parts of the muffle are assembled on the machine, their cavities interlap, as clearly illustrated in Fig. 8, and the air of the room is introduced into the tube 30 by way of the muffle through the small opening 114 which is located along the median line of the muffle and extends to the heating tube 30. The air from the room, however, will not have free passage through the opening or trough 114 in the muffle, the passage of the air being retarded by air eddy currents set up in the semicircular cavities 112. Thus when the air is drawn in through the opening 114 it will first strike the lower cavity 112, in which an air eddy current whirl will be set up, and a similar whirl will be set up in each one of these cavities extending the entire length of the muffle up to the tube 30. The extent of these whirls will depend more or less upon the difference in temperature of the air in the tube 30 and the muffle and the temperature of the air in the outside room, the whirl increasing as this difference of temperature is increased. When this difference of temperature becomes great enough, the air action in the muffle is such that practically no air whatever is drawn through the passage 114.

To provide for the emergency when it is impossible to properly regulate the air intake into the tube 30 through the opening 114, the air regulator or vent 115 located at the top of the muffle above the eddy current whirl is provided. This regulator comprises a plate 116 fitted with circular openings 117 and 118 which can be rotated to aline the openings 117 and 118 with similar openings 119 and 120 in the muffle proper, whereby air from the room will be admitted directly to the tube 30 above the air eddy current whirl in the muffle. Obviously this regulator 115 can be set for any sized opening desired and thereby constitutes an efficient auxiliary whereby heat regulation in the tube 30 can be absolutely and properly controlled. The part 110 of the muffle is attached to a lug 121 depending from the terminal or connector 97 by means of the screw 122. Attached to the lower horizontal member of the angle iron frame support 123 are two pins such as 124 fitted with insulating bushings such as 125, similar to the pins 100 and bushings 99. Circular openings in a projecting lug 126, secured to the lower end of the part 110 of the muffle, ride on these bushings, whereby the lower end of the muffle is secured to the frame by means of a sliding contact which serves to take care of expansion and contraction of the tube 30, due to heating and cooling, to which the muffle is also subjected because it is directly attached to said tube.

The front part of the muffle 111 is connected to the part 110 by means of a latch 130 attached thereto which coöperates with a lug 131 secured to the part 110. A handle 132 is attached to the lug 130, the horizontal member of said handle being held in position by a flat spring 133 secured to a lug cast on the front face of the part 111 of the muffle. The spring 133 serves to hold the latch 130 in contact with the lug 131, and said spring may be depressed by the operator to push the latch out of the path of the lug 131 when the front part of the muffle 111 is to be removed from the machine.

The wire 61 after emerging from the top part of the tube 30 is exposed for a short time to the room temperature to cool and harden the insulated coating of enamel, after which it is threaded over a sheave such as 134 mounted on a spindle 135 which is secured in a bracket 136 which in turn is attached to an angle iron cross piece 137 at the top of the machine, as indicated in detail in Figs. 4 and 6. After the wire has been carried over one of the sheaves 134 it is fed downwardly on the outside of the sheet metal inclosure 33 of the machine and then threaded over the second sheave 66 on the lower spindle 67, after which it is again drawn through the muffle and tube. For the purpose of preventing vibration of the wire, one or more rollers fitted with a soft pliable circumferential surface, such as felt for example, may be used with each heating tube. These rollers are preferably placed on the front surface of the casing 33 so that the wire will feed over said rollers as it is fed downwardly on the outside of the machine in its travel from one of the upper sheaves 134 to one of the lower sheaves 66. The wire is thus carried up through the tubes and baked and back on the outside of the machine for a definite number of times, depending upon the thickness of the coating of insulating enamel which is desired.

Fitted at the upper part of the machine and in direct communication with the two heating tubes 30 of an operating unit is a smoke and vapor regulating and confining mechanism. This mechanism consists of a copper tube 31 located along the center line of the machine which at its upper end is in direct communication with the tubes 30 by means of the passageways 138 and 139, and which at its lower end fits into a tapered chamber cored in the base casting, which in turn is connected with an exhaust system, thereby creating a force draft in the tube 31. The passageways 138 and 139 are each fitted with the cast iron pivoted traps 140 and 141 and 142 and 143 respectively. Between these traps extends an opening through which the wire 61 is fed from the tubes 30 to the upper sheaves 134. These traps are provided so that the interior of the smoke confining and regulating mechanism may be exposed for cleaning purposes and for repairs. Since the force draft in the tube 31 is in direct communication with the heating tubes 30 by means of the passageways 138 and 139, the smoke and vapor generated in the tubes 30 during the baking operation is drawn from said tubes into the tube 31, from where it is fed by suitable piping to a chimney exhaust. The vapors generated in the baking operation are consequently thoroughly confined and not dissipated in the room atmosphere.

Secured to supporting angle irons such as 93 is the bracket 144 which carries a water supply main 145. The flow in this water supply main is regulated by means of the valve 146 fitted in the vertical feed pipe, illustrated in Fig. 4. Tapped into the water supply main 145 above each smoke and vapor exhaust pipe 31 is a water supply cock 147 which leads into a pipe 148, the end of which is secured to a water spray 149 which serves to spray the gases and vapors as they leave the chambers 138 and 139 and enter the exhaust tube 31. The water enters the cavity 150 of the sprayer 149 from the pipe 148, from which cavity it is fed by the water spreader 151 into the tube 31. The water spreader 151 is inclosed in a conical housing 152 which serves to reduce the direct contact between said smoke and vapor and the spreader 151 and whereby condensation of the vapor and smoke on said spreader is reduced. This protection is necessary because the vapor which is emitted from the tubes 30 is very heavy and if allowed to come in direct contact with the water spreader would, because of the rapid cooling action of the cold water, soon condense enough solid material about the water spreader 151 to clog up the water spraying passage and stop the flow of the water. By the use of the conical protecting hood 152 this clogging action, due to condensation, is very much reduced.

Notwithstanding this protection of the water spreader, a certain amount of vapor residue collects thereon which must be periodically cleaned to insure the proper operation of the water circulating system. For this purpose the spreader is equipped with the plunger 153 which is held in its uppermost position by the spiral spring 154 compressed between the pin 155 on the plunger and the bottom wall of the rectangular opening 156. To the lower end of this plunger is secured the water spreader 151. Consequently when the plunger 153 is depressed the spreader 151 is lowered and an increased flow of water from the pipe 148 will flow by the spreader and clean out the collected vapor residue. The use of this water spray in combination with the exhaust is exceedingly beneficial, as the cold water of the spray decreases the volume of the vapor or gases. The water also serves to completely destroy the fire hazard. The water which travels down the tube 31 is fed into the tapered chamber cored in the base casting, from where it is pumped through a filtering device and after which it is recirculated.

The spindle 67, which carries the sheaves or pulleys at the lower end of each machine unit, and the spindle 135, which carries the sheaves or pulleys at the upper end of each machine unit, are secured to the mounting brackets in such a manner that they can be readily removed. As shown in Figs. 12 and 13, the arms 157 of the bracket 136 are drilled to receive a bushing 158 which is rotatably mounted thereon and held in the arm 157 by the right-angled shoulder 159. Mounted in the bushing 158 is the spindle 135, the spindle and bushing being held in place by the cotter pin 160. It will be evident that with this type of mounting the bushing, spindle, and sheaves, which are loosely mounted on the spindle, are all free to rotate. It will likewise be evident that when the retaining cotter pin is removed the bushing and spindle can be readily taken out of the bracket arms and the pulleys or sheaves removed for cleaning purposes or repair. The use of the bushing 158 is advantageous as it provides a hardened bearing surface for the spindle 135 and thereby simplifies the construction of the bracket and it also minimizes the cost of repair due to wear.

The heating tubes 30 and their associated connecting lugs are thoroughly insulated from all the rest of the machine, as hereinbefore described and clearly illustrated in the drawings, and the connecting lugs are interconnected by copper ribbon connecting strips and wired to an external source of electrical current. As indicated in Fig. 20, power is supplied to the machine from the three-phase power leads 161, 162, and 163 which are connected to the choke coils 164, 165, and 166 respectively, the circuit from the choke coils terminating in the primary of a transformer 167 which is delta connected. The secondary 168 of said transformer is star connected, and the three leads from the star connected secondary are wired through resistances such as 102 to three of the tube heating elements 30 and thence through another resistance such as 102' at the top of said tubes, the end of said resistances being interconnected or short-circuited, whereby the three tubes are also star connected. All of the heating tubes in the machine are wired in this manner, as clearly illustrated in Fig. 20. With this form of connection an equal amount of current flows through the three tubes of each connection in both directions and consequently no inductive disturbances are produced, due to the close proximity of all the heavy steel structural framework. The wiring of the oven in this manner is also advantageous because it is possible to vary the amount of resistance in series with each heating tube element 30 and thus control thereby the division of current flow between the three tubes of a circuit, and whereby temperature regulation for each individual tube is possible.

In the operation of the machine power is first applied to the circuit illustrated in Fig. 20 and the desired temperature procured in the various tubes. The spool containing the wire which is to be insulated is then mounted on the spindle 35, as hereinbefore described, and the wire threaded through the pulleys of the tensioning device, after which the wire is threaded about the first sheave at the bottom of the machine, the compound container 70 having been removed from the machine so as to completely expose the lower sheaves or pulleys. The wire threaded about the first sheave is then carried through the muffle, through the oven, and over a top sheave, thence down the front part of the machine, over the second sheave at the bottom, this wire stringing operation through the heating tube and back down the front of the machine being continued for the number of insulating coatings it is desired to bake on the wire. After the wire has been strung through the heating tube for the last time it is carried over a sheave 134 at the top of the machine from where it is fed to any suitable power driven take-up device, the speed of which is regulated to the rate of speed at which it is desired to enamel the wire.

After the wire has been thus strung through the oven the compound containers 70 are put into place as hereinbefore described and the compound distributing system is started by regulating the supply cock 74 and the drain cock 81 associated with each container 70. Depending upon the rate of speed of the take-up device, the wire will now be drawn from the supply reel through the compound in the container and through the heating tubes the desired number of times, after which it will be fed from the machine to a suitable rotating spool on the take-up device.

The new machine comprises many advantages, the principal ones of which are its efficient operation because of the conservation of the heat utilized in the baking process and the speed with which the wire is baked. The machine is also very advantageous because of its adaptability for insulating operations of various characters. Thus it will be noted that each heating tube unit is supplied with an individual compound container and the heating unit is arranged for individual heat regulation. It consequently follows that each unit can be used for applying a different character of insulating enamel irrespective of whether said insulating enamels require different baking heats. Obviously when the machine is operated with different grades of insulating compound the compound circulating system is not utilized. However, the machine is so constructed that it will be serviceable for applying practically any type of compound to substantially all sizes of wire with which baked enamel insulating coatings are used irrespective of the baking heat desired, as each baking unit of the machine to all intents and purposes is an individual unit which may be operated entirely independently of the remaining units of the machine.

Obviously the invention is not limited to the preferred embodiment illustrated and described, but is capable of many variations and other applications without departing from its spirit and scope, as set forth in the following claims.

What is claimed is:

1. In a wire coating machine, in combination, a plurality of baking tubes, means for heating each of said tubes, a wire coating mechanism associated with each of said tubes, means for drawing wire through said coating mechanism and its associated tube, and means to regulate the air currents in each of said tubes.

2. In a wire coating machine, in combination, a plurality of baking tubes, means for heating each of said tubes comprising an electric current conducting circuit including the walls of said tubes, a wire coating mechanism associated with each of said tubes, means whereby a wire may be drawn through said coating mechanism and its associated tube, and means to regulate the air currents in each of said tubes.

3. In a wire coating machine, in combination, a plurality of baking tubes, means for heating each of said tubes, a wire coating mechanism associated with each of said tubes, means for drawing wire through said coating mechanism and its associated tube, means to independently regulate the air currents in each of said tubes, and means to regulate each tube heating means.

4. In a wire coating machine, in combination, a plurality of heating tubes mounted in pairs, means for heating each of said tubes, a vapor exhausting means associated with and connected to each pair of tubes, a wire coating mechanism associated with each of said tubes, means for drawing wire through said coating mechanism and its associated tube, and means to independently regulate the air currents in each of said tubes said air currents and the generated vapor being discharged into said vapor exhausting means.

5. In a wire coating machine, in combination, a metallic heating tube, a supporting mounting therefor, a wire coating mechanism associated with said tube, means for heating said tube comprising an electric current conducting circuit which includes the walls thereof, metallic terminals connected to each end of said tube for connecting said tube in said circuit one of said terminals comprising the sole means for suspending said tube from said supporting mounting, and means associated with said second terminal for slidably associating the other end of said tube with said supporting mounting.

6. In a wire coating machine, in combination, a metallic casing, a plurality of heating tubes mounted in pairs within said casing, means for heating each of said tubes, an air regulating means associated with one end of each of said tubes, a smoke exhausting means associated with the other end of said tubes, a wire coating mechanism associated with each of said tubes, means for drawing the wire through said coating mechanism said air regulating means and said tube, and means for independently regulating the temperature maintained in each of said tubes.

7. In a wire coating machine, in combination, a plurality of heating tubes, means for heating each of said tubes, an air regulating means associated with each of said tubes, an individual compound container for each of said tubes, a compound supply pipe, means for supplying compound from said pipe to each of said containers, and means for draining the compound from each of said containers and returning it to said supply pipe.

8. A machine for coating wires comprising a vertical rectangular inclosing chamber, a plurality of metallic heating tubes contained within said chamber, means for connecting each of said tubes to a source of current to heat the same, an air regulating mechanism associated with the bottom of each of said tubes, a compound container associated with and individual to each of said tubes, a plurality of sheaves rotatably mounted in each of said containers, a wire supply spool mounting means, and means for guiding the wire from said supply spool to the sheaves in said container and through said air regulating device and heating tube whereby a coating of insulating enamel is baked thereon.

9. In a wire coating machine, in combination, a plurality of heating tubes mounted in pairs, a wire coating means, wire feeding means to feed the wire through said coating means to said tubes, a smoke exhaust pipe individual and connected to each pair of tubes, a water sprayer associated with each exhaust pipe for spraying the smoke as it enters said pipe, a hood associated with said spraying means discharging into said exhaust pipe, and means for cleansing said sprayer.

10. In a device of the character described, in combination, a metallic heating tube, an air regulating means connected to one end of said tube, a wire coating mechanism, means for introducing said wire from said coating means through said air regulating means into said tube, and an air eddy current generating means associated with said regulating means to limit the flow of air from the room through said regulating device to said tube.

11. In a machine of the character described, the combination with a metallic heating tube, of an air regulating device connected to one end of said tube, a wire coating mechanism, means for feeding the wire from said coating mechanism through said regulator into said tube, air eddy current generating means associated with said regulator for controlling the flow of air from the room through said regulator into said tube, the amount of flow of said air depending upon the difference in temperature of the air in said tube and regulator and the room atmosphere, and an auxiliary means for introducing the room atmosphere into said tube above said eddy current whirl.

12. In a wire coating machine, in combination, an inclosing casing, a plurality of heating tubes mounted in pairs in said casing, and a wire coating means and a wire feeding means individual to each of said tubes.

13. In a wire coating machine, in combination, an inclosing casing, a plurality of heating units each comprising a pair of heating tubes, and a wire coating and a wire feeding means individual to each of said tubes.

14. In a wire coating machine, in combination, an inclosing casing, a plurality of heating units each comprising a pair of heating tubes, a wire coating and a wire feeding means individual to each of said tubes, and a vapor exhausting means individual to each of said units.

15. In a wire coating machine, in combination, an inclosing casing, a plurality of heating tubes in said casing, a source of current supply for heating said tubes, and means connecting one end of each of said tubes to one terminal of said source said means also serving to suspend the tubes in said casing.

16. In a wire coating machine, in combination, an inclosing casing, a plurality of heating tubes in said casing, a source of current supply for heating said tubes, means connecting one end of each of said tubes to one terminal of said source said means also serving to suspend the tube in said casing, and means connecting the other end of each tube to a second terminal of said source which means also serves to guide said tubes in their longitudinal movement due to heat expansion and contraction.

17. A machine for coating wires comprising in combination, an inclosing casing, a plurality of baking tubes in said casing, means for mounting said tubes in said casing said means being insulated from said casing, and a source of current supply connected to said means for heating said tubes.

18. A machine for coating wires comprising in combination, an inclosing casing, a plurality of heating tubes in said casing, means for suspending said tubes in said casing, means for guiding the longitudinal movement of said tubes due to heat expansion and contraction, and a source of current supply connected to said suspending and guiding means.

19. In a wire coating machine, in combination, an inclosing chamber, a plurality of heating tubes in said chamber, means for suspending said tubes in said chamber, means for guiding the longitudinal movement of said tubes due to heat expansion and contraction, an air regulating muffle attached to one end of each of said tubes, a source of current supply connected to said suspending and guiding means, and a muffle guiding means insulatively attached to said chamber.

20. In a wire coating machine, the combination with a plurality of baking tubes, of means for heating each of said tubes, a wire coating mechanism associated with each of said tubes, means for drawing the wire through said coating mechanism and its associated tube, and means for regulating the admission of atmospheric air to each of said tubes to control the temperature thereof.

21. In a wire coating machine, in combination, a plurality of baking tubes, means for heating each of said tubes, a compound container individual to each of said tubes, a main compound supply pipe, means for supplying compound to said containers from said pipe, means for isolating any container from said main supply whereby a different kind of compound can be used with any one or all of said tubes, and means for drawing wire through each of said containers and its associated tube.

22. In a wire coating mechine, in combination, a plurality of baking tubes, means for heating each of said tubes, means to independently regulate the air currents in each of said tubes, a compound container individual to each of said tubes, a main compound supply pipe, means for supplying the compound to said containers from said pipe, means for isolating any container from said main supply whereby different kinds of insulating compounds may be used with different tubes, and means for drawing wire through said containers and their associated tubes.

23. In a wire coating machine, in combination, a plurality of baking tubes, means for heating each of said tubes, means to independently regulate the air currents in each of said tubes, means to regulate each tube heating means, a compound container individual to each of said tubes, a main compound supply pipe, means for supplying the compound to said containers from said pipe, means for isolating any container from said main supply whereby different grades of compound can be used with different tubes, and means for drawing wire through each of said containers and its associated tube.

24. In a machine of the class described, the combination with an inclosing casing, of a plurality of baking tubes in said casing, means for heating each of said tubes, a wire guiding means individual to each of said tubes, a compound container individual to each of said tubes and associated with said wire guiding means, means to suspend said container from said casing, and means whereby the location of said container on said casing may be adjusted so as to vary the depth to which the wire is immersed in said container.

25. A machine for coating wires comprising an inclosing casing, a plurality of heating tubes contained within said casing, means for connecting each of said tubes to a source of current to heat the same, a compound container associated with and individual to each of said tubes, means to suspend said container from said casing, a plurality of sheaves rotatably mounted in each of said containers, a wire supply spool mounting means, means for guiding the wire from said supply spool to said sheaves in said container, and means whereby the location of said container on said casing may be adjusted to vary the depth to which the sheaves are immersed in said container.

26. In a wire coating machine, in combination, a baking tube, means for heating said tube, and a muffle for regulating air currents in said tube said muffle comprising means whereby air eddy currents are set up in said muffle which retard the passage of air into said tube.

27. In a wire coating machine, in combination, a baking tube, means for heating said tube, and a muffle for regulating air currents in said tube said muffle comprising two series of substantially semi-circular depressions arranged on either side of a central opening connecting said tube with the room atmosphere.

28. In a coating machine, in combination, a material heating means, means for drawing material through said heating means, and a muffle for regulating air currents in said means said muffle comprising means whereby eddy currents are set up in said muffle which retard the passage of air into said heating means.

29. A coating machine comprising in combination, a baking tube, means for heating said tube, a muffle for regulating air currents in said tube, said muffle comprising two parts each part having a series of substantially semi-circular depressions, and means for connecting said parts to said tube to construct a restricted opening which connects said tube with the room atmosphere, said depressions being alined on either side of said opening with overlapping ends.

In witness whereof, we hereunto subscribe our names this 22nd day of June, A. D., 1917.

FREDERIC S. KOCHENDORFER.
HARRY BLOUNT